Feb. 14, 1967  G. A. GRANITSAS  3,304,244

METHOD OF SEALING FIBER OPTIC PLATES

Filed Oct. 30, 1963

INVENTOR
GEORGE A. GRANITSAS

BY
ATTORNEY

United States Patent Office 3,304,244
Patented Feb. 14, 1967

3,304,244
METHOD OF SEALING FIBER OPTIC PLATES
George A. Granitsas, Marlboro, Mass., assignor to American Optical Company, Southbridge, Mass., a voluntary association of Massachusetts
Filed Oct. 30, 1963, Ser. No. 320,134
3 Claims. (Cl. 204—20)

This invention relates to plate structures having energy receiving and emitting opposite end faces and formed of a multiplicity of fused fiber elements extending from one face toward the other. The invention has particular reference to a novel and improved method of hermetically sealing porosities in such structures.

Fiber plates are used in energy converting devices to conduct light or other forms of energy from one compartment to another in the device or, as in the case of the cathode ray tube, to conduct such energy through and to the exterior of an evacuated tube envelope. In the cathode ray tube application, for example, the face plate must be capable of sustaining the usual vacuum provided within the tube envelope throughout the expected life of the tube.

Fiber face plates are formed by bundling a number of individual fiber elements together in mosaic fashion and heating the array thereof to fusing temperature. During fusion, compressing forces are usually applied laterally to the array of fiber elements in an attempt to close and seal as many voids therebetween as possible. However, in view of the fact that most fiber plates are made up of thousands of very fine fiber elements, it is difficult to obtain a truly hermetic seal between each and every fiber at the time the face plate is fabricated. Where such seal is not attained the resultant face plate structure is permeable to gases when subjected to pressure or the pull of a vacuum developed within the tube into which it is sealed. Accordingly, in such condition, they are unsuitable for use in devices such as cathode ray tubes or the like.

Heretofore, numerous attempts have been made to overcome this problem usually by way of variations in techniques used to fabricate the plates rather than with attempts to remedy those rejected only because of their permeable nature.

Techniques of fabrication which turn to the use of exceptionally high temperatures and pressures in the order of those required to assure a complete vacuum seal between all fiber elements of a face plate structure usually cause the fiber elements to become overheated and seriously distorted. Though a vacuum tight plate can be thus produced it is at the cost of a degradation of the optical or energy transmitting characteristics of the plate.

In instances where it has been attempted to seal permeable fiber plates with blanket coatings of relatively low melting temperature glass or the like applied to the energy receiving and/or emitting faces thereof, the resultant coatings have been found to be adverse to the energy-transmitting properties of the fibers. Furthermore, such coatings are difficult and costly to apply.

The present invention relates more particularly to a process which, as a follow-up to any or all processes used to form fiber plates, can be used to seal interstices, crevices, fissures and other such porosities in the plates to render them vacuum tight and suitable for use in evacuated electron tubes or the like.

Accordingly, an object of the present invention is to provide for the sealing of porous fiber plate structures in a simple, inexpensive and reliable manner; and to provide for the hermetic sealing of interstices, crevices, fissures and other such porosities in fiber plate structures without adversely affecting the energy receiving or emitting properties of respective fibers in the plate structures.

Another object is to accomplish the foregoing by providing a sealing medium internally of such porosities in fiber plate structures and to cause said medium to be formed in situ.

To attain the aforesaid objects and others which may appear from the following detailed description, in accordance with one aspect of the present invention, I position a porous fiber plate structure to be sealed as a partition between two compartments of a two part electrolytic cell. One side or face of the plate is positioned in surface contact with the cells' cathode which, in a presently preferred arrangement, consists of a fluid electrically conductive medium such as mercury. The conductive medium is contained within one compartment of the cell and is provided with an electrode which, in turn, is connected to one terminal of a source of electric current. In the other compartment of the cell, an electrolyte in solution is caused to cover the opposite side of the fiber plate and an electrode in the solution is connected to the opposite terminal of said source of current to render the electrolyte anodic. The electrolyte consists of an aqueous solution of one or more preselected metallic salts such as copper sulphate and/or nickel sulphate which, when under the influence of current passing through the solution, are caused to dissociate with the metallic constituent of molecules of the salt being positively electrified in the form of cations. Such cations are, by attraction to the cells cathode, drawn into interstices, crevices, fissures or similar porosities in the fiber plate. Neutralization of the electrical charge on the cations resulting from direct or indirect electrical contact with the cell's cathode causes precipitation thereof in the porosities of the plate. Being so formed in the porosities, the metallic precipitate produces a constriction therein. Such electro-deposition of the metallic precipitate in the porosities is continued until the build-up thereof in respective porosities is sufficient to render the plate vacuum tight.

The present invention will be more fully understood by reference to the following detailed description which is accompanied by a drawing in which FIG. 1 illustrates in elevation and partly in section an electron tube having an energy-conducting face plate of the type relating more particularly to this invention;

Figure 1:
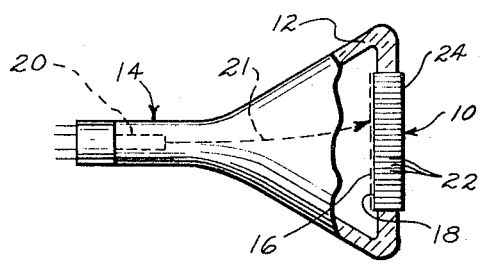

Referring now to FIG. 1, there is shown a fiber plate 10 which is illustrative of one type to which the sealing process of this invention is especially applicable. Plate 10, in this instance, is intended to receive and transfer light energy through the evacuated envelope 12 of cathode ray tube 14. To this end, a phosphor coating 16 is provided upon the image receiving face 18 of plate 10 so that electron gun 20 within the tube can direct an electron beam 21 onto phosphor 16 for exciting the same. A light image so formed on face 18 is received by fibers 22 which make up plate 10. As individual light guides, fibers 22 conduct a large part of the light image through plate 10 for reproduction thereof in mosaic form upon face 24 exteriorly of tube 14.

Figure 2:
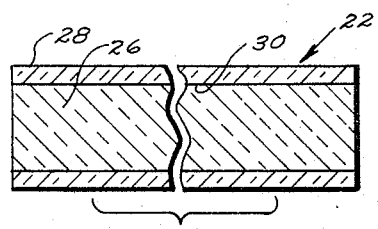
FIG. 2 illustrates, in greatly enlarged form, a longitudinal cross-section (broken away intermediate its ends) of one type of energy-conducting fiber useful in the fabrication of such face plates.

Fibers 22 are usually formed of optical glass or the like and, as illustrated in FIG. 2, they each embody a core 26 of material having a relatively high index of refraction surrounded by a relatively thin cladding 28 of material having a relatively low index of refraction.

This construction provides a light-reflecting interface 30 between core 26 and cladding 28. Thus, light which enters one end of such a fiber and which is incident upon interface 30 at an angle greater than the critical angle of reflection for the interface will be repeatedly reflected and conducted through the fiber to its opposite end according to the principles of total internal reflection. A typical fiber 22 might, for example, embody core 26 formed of optical flint glass having an index of refraction of approximately 1.75 and cladding 28 formed of crown or soda lime glass having an index of refraction of approximately 1.52. Other core and cladding glasses such as 1.81 index lanthanum flint and 1.48 index borosilicate glasses respectively can be used. Also, the fibers may be formed of special core glasses characterized to be predominantly transmissive to preselected regions of the spectrum and the cladding glasses may have controlled light absorbing and/or other special characteristics.

Fibers 22 may be either the single core type such as illustrated in FIG. 2 or the multifiber type as shown in Patent No. 2,992,516 assigned to the assignee of the present application. Multifibers each embody a plurality of energy-conducting cores surrounded by individual claddings all fused together.

For use in cathode ray tubes, fibers having core sizes of only a few microns in diameter are usually preferred. However, fibers ranging in size from approximately 3 microns in diameter to 4 mils or larger in diameter are useful. The smaller diameter fibers produce better resolution in transferring light images provided they are not so small in diameter as to approach the wavelength of light which is to be transferred thereby.

Figure 3:
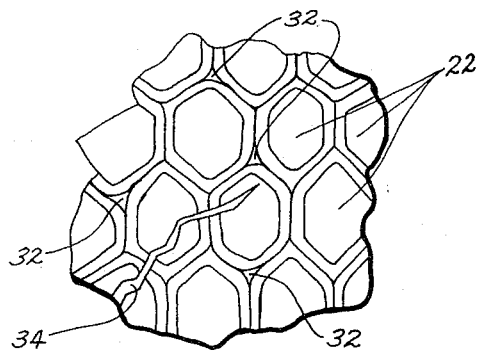
FIG. 3 is a greatly enlarged fragmentary plan view of the face plate illustrated in FIG. 1.

In forming the fused structure of fiber plate 10 a multiplicity of fibers 22 are placed in side-by-side bundled relation with each other and heated to their fusing temperature. While heated, the bundle is compressed laterally to squeeze the fibers into intimate interfitting relation with each other substantially as shown in FIG. 3. The respective fibers may be initially circular, square, hexagonal or of any other desired cross-sectional configuration. Hexagonal fibers have been shown in FIG. 3 for purposes of illustration only.

Details of the various techniques which can be used to fabricate fiber plates will not be dealt with herein since the present invention relates to the treatment of any or all such plates which may have been formed to this point by whatever technique. It is only sufficient to point out that, under the best of conditions, fused fiber structures such as plate 10 will occasionally be found not to be vacuum tight. Accordingly, the present invention relates particularly to a process for rendering such porous fiber plates vacuum tight.

Figure 5:
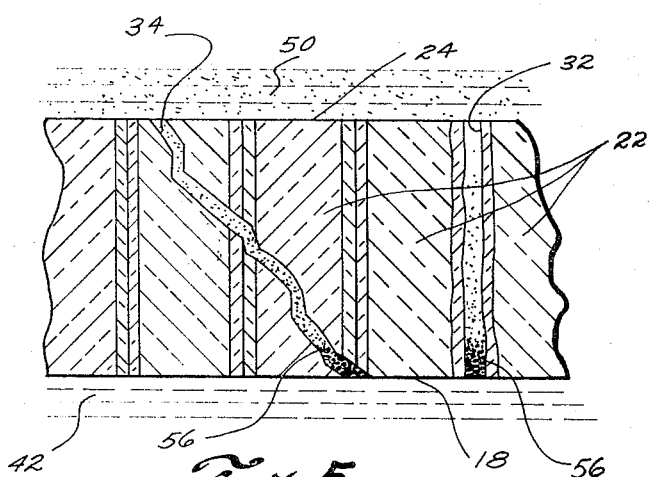
FIG. 5 is a greatly enlarged fragmentary cross-sectional view taken on line 5—5 of FIG. 4.

Porosities in fused fiber plates usually occur in the form of interstices 32 (see FIGS. 3 and 5) extending longtudinally between certain fibers which do not become completely closed at the time the fused fiber structure is fabricated. These interstices are usually minute and many times smaller in transverse dimension than the size of the fibers which make up the fiber plate so that they are not readily detectable by visual inspection. Nevertheless, under the pull of a vacuum equivalent to that which would be experienced by the plate if used in a cathode ray tube, for example, air or gases would tend to permeate through interstices however small they might be. Minute fissures 34 (see FIGS. 3 and 5) such as might result from strain or other causes occasionally occur during or following fabrication of a fiber plate. This type of porosity also contributes to the gas permeability of fused fiber plates. Fissure 34 or interstices 32 might not extend directly through the fiber plate as illustrated in FIGS. 3 and 5 but, instead, they might extend somewhat laterally into communication with one another to constitute a porosity extending through the fiber plate.

Most fabricating techniques are refined to the point where porosities such as mentioned above and others that might exist are not usually of a size which would be detrimental to the energy-conducting properties or physical strength of the fiber plate. That is, in transverse dimension, porosities such as 32 or 34 are usually in the order of only a few microns in transverse dimension and many times smaller than the transverse dimension of fibers 22 (see FIGS. 3 and 5). Nevertheless, the porosities do render the particular fiber plate unsuitable for use in cathode ray tubes or other electron devices whose envelopes are evacuated or, for special application, might be pressurized.

Figure 4:
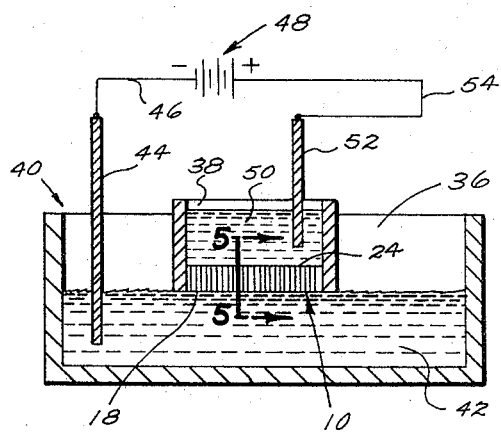
FIG. 4 illustrates means and method for carrying out the process of the invention.

In accordance with the principles of this invention, interstices, fissures and/or other porosities in fused fiber plates are sealed in the following manner:

After testing and determination that a fiber plate 10 is porous, it is placed as a partition between two compartments 36 and 38 of a two part electrolytic cell 40 (see FIG. 4). One face, either 18 or 24 (18 being selected for purposes of illustration) is positioned in direct surface contact with the cathode of cell 40. In a presently preferred arrangement, the cell's cathode consists of a fluid electrically conductive medium 42 such as mercury or a fluid amalgam which is of such viscosity as to assume a substantially uniform contact with all portions of face 18. Electrode 44 disposed in medium 42 is electrically connected by lead 46 to the negative terminal of direct current source 48. Medium 42 may consist of a metal such as indium having a melting temperature of approximately 300° Fahrenheit which, when in a fluid state, will wet face 18 of plate 10 and fill in scratches, indentations or other irregularities on face 18 to assure uniform contact with all portions of the face. Other similar low melting temperature mediums such as gallium alloys or various combinations of indium, bismuth, cadmium, lead and tin can be used. Such low melting temperature mediums would be heated to a fluid consistency when applied to face 18 and allowed to harden in place. Electrical connection from the particular metallic medium to the negative terminal of current source 48 by lead 46 would be made with or without electrode 44.

In compartment 38 an aqueous solution 50 containing an electrolyte is caused to cover the opposite side 24 of fiber plate 10 and solution 50 is rendered anodic by the provision of electrode 52 disposed therein and electrically connected by lead 54 to the positive terminal of current source 48. In solution 50, the electrolyte may consist of copper sulphate, for example, or a combination of compatible metallic salts such as nickel sulphate together with the copper sulphate. Various other well-known metallic salts such as copper or nickel chlorides or gold and silver cyanides can be used. In general, any salt which will dissociate readily to form a precipitate capable of sealing porosities in a porous fiber plate is applicable to the practice of this invention. The particular salt selected for use in solution 50 should, however, be of such composition that its precipitate will be capable of withstanding relatively high temperatures such as might be applied to the sealed face plate during subsequent heat treatment thereof including assembly in an electron tube envelope or the like. Such temperatures would ordinarily be lower than 1100° Fahrenheit and the use of salts whose precipitates will decompose at temperatures below this figure should be avoided. Furthermore, when combining salts to be used as electrolytes, care should be taken to avoid a combination in which the precipitate of one salt might be soluble in a chemical such as an acid radical formed by electrolysis of the other salt.

Under the influence of electrical current passing through solution 50, the electrolyte therein (for example, copper sulphate) is caused to dissociate with the metallic constituent of molecules of the salt being positively electrified in the form of cations. The cations, by attraction to cathode 42, are drawn into porosities 32 and 34 of fiber plate 10. Upon contact with cathode 42 adjacent face 18 of fiber plate 10, the positive electrical charge on the cations is neutralized causing a precipitate 56 of the metallic constituent of the salt to form in the porosities (see FIG. 5). In the case where copper sulphate is used, copper will be formed as the particular precipitate and thereby provide a constriction in the porosities of fiber plate 10. Other cations making contact with the first formed precipitate are similarly electrically neutralized, and so on, until a substantial build-up of the precipitate in respective porosities is effected. The electrolytic action is preferably continued until porosities 32 and 34 in the fiber plate are completely filled with the precipitate or at least until it is determined that a vacuum tight seal has been formed in all of the porosities.

By way of illustration, a solution 50 suitable for carrying out the process of the invention may consist of 200 grams of copper sulphate and 60 grams by weight of concentrated sulphuric acid both dissolved in one liter of distilled water.

With a solution 50 consisting of the foregoing related proportions of ingredients actual treatment of a fiber plate having a leak rate of $1.5 \times 10^{-7}$ cubic centimeters of helium per second was performed in accordance with the principles of the present invention as follows:

With solution 50 at room temperature, a six volt potential was applied to cell 40 for a period of approximately two hours. Thereafter, testing of the fiber plate with a standard helium leak detector known as a "Mass Spectrometer Leak Detector" indicated no leak in the fiber plate.

In accordance with the usual procedure in preparing a fiber plate for application to an electron tube envelope, the above mentioned fiber plate was heated to approximately 400° Fahrenheit for approximately one hour to volatilize and dispel a large part of the inherently adsorbed and/or absorbed moisture therein. Following this heat treatment, the fiber plate continued to remain vacuum tight and suitable for use in an evacuated cathode ray tube or the like.

I claim:

1. The method of sealing porosities in a fiber optic plate which comprises the steps of positioning one face of said plate in surface-to-surface contact with the cathode of an electrolytic cell, placing a metal salt in solution against the opposite face of said plate, causing an electric current to pass through said solution and porosities in said plate toward said cathode and cause respective metal cations of said salt to move into said porosities by attraction to said cathode and become precipitated therein whereby such precipitate will form a seal in said porosities.

2. The method of sealing porosities in a fiber optic plate which comprises the steps of positioning such plate as a partition between the cathode and anode of an electrolytic cell, the cathode being in surface-to-surface contact with one face of said plate, placing a metal salt electrolyte in solution against the opposite face of said plate, causing an electric current to pass through said electrolyte and porosities in said fiber plate toward said cathode to move dissociated cations of said electrolyte into said porosities thereupon neutralization of respective electrical charges on said cations when electrically influenced by said cathode will cause precipitation and electrodeposition thereof in said porosities to seal said porosities.

3. The method of sealing porosities extending through a fiber optic plate from one face to the other thereof comprising positioning said plate as a partition between two compartments of a two part electrolytic cell, placing a fluid metal in one of said compartments and a fluid electrolyte containing the dissolution of a metallic salt in the other compartment, said fluid being respectively in contact with opposite faces of said fiber plate and electrically connecting said medium respectively to opposite poles of a source of electric current to cause electrical dissociation of said metallic salt and electrodeposition of at least one dissociated constituent thereof in said porosities of said plate to form a seal therein.

References Cited by the Examiner
UNITED STATES PATENTS 2,217,334  10/1940  Diggory et al. _____ 204—15

FOREIGN PATENTS 128,448  2/1902  Germany.

JOHN H. MACK, *Primary Examiner.*

T. TUFARIELLO, *Assistant Examiner.*